United States Patent Office 2,830,082
Patented Apr. 8, 1958

2,830,082

N-(HYDROXYALKYL) TAURINE COMPOUNDS AND METHOD OF PREPARATION

Arthur R. Sexton and Edgar C. Britton, Midland, Mich., assignors to The Dow Chemical Company, Midland, Mich., a corporation of Delaware No Drawing. Application March 27, 1957
Serial No. 648,773

11 Claims. (Cl. 260—513)

This invention relates to N-(hydroxyalkyl) taurines, alkali metal salts thereof, and their method of preparation.

The compounds,

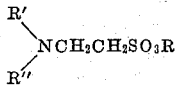

wherein R is a member of the group consisting of hydrogen and alkali metals, R' is a member of the group consisting of hydrogen, the methyl radical and hydroxyalkyl radicals containing from 2 to 4 carbon atoms, and R" is a hydroxyalkyl radical containing from 2 to 4 carbon atoms, have now been discovered.

The monohydroxyalkylated taurines are prepared by reacting substantially equimolar proportions of an alkali metal salt of taurine or N-methyltaurine with a 1,2- or 2,3-alkylene oxide having 2 to 4 carbon atoms, while the dihydroxyalkylated taurines are prepared by reacting substantially 2 equimolar proportions of such alkylene oxide per mole of an alkali metal salt of taurine in aqueous medium at temperatures advantageously between 5° and 40° C. By "substantially equimolar" and "substantially 2 equimolar" proportions is meant from 0.9 to 1.1 moles of either co-reactant per mole of the other co-reactant, in the first instance, and from 1.8 to 2.2 moles of alkylene oxide per mole of taurine alkali metal salt in the second instance. Larger excesses of reactants than those indicated would give rise to purification difficulties.

In practice, taurine or N-methyltaurine in the alkali metal salt form, is dissolved in water in a vessel advantageously provided with a refrigerated reflux head vented to a cold trap, an agitator, a thermometer and an inlet pipe for introducing alkylene oxide preferably under the surface of the liquid. The requisite, i. e. substantially the stoichiometric, amount of alkylene oxide is gradually added with agitation at a reaction temperature maintained between 5° and 40° C. by means of refrigeration. A reaction time between one-half and two hours is generally sufficient. The reaction product is recovered as the alkali metal salt by evaporating the reaction medium advantageously under vacuum. Alternatively, the free acid product can be obtained by passing the aqueous reaction mixture through a cation exchange resin column to remove alkali metal ion. The resulting eluate is evaporated to give the N-(hydroxyalkyl) taurine product as the free acid.

In representative operations, N,N-bis(2-hydroxyethyl)-taurine and N-(hydroxyethyl) taurine were found to be effective against mites on lima bean plants and against adult pea-aphids on Perfection pea plants without foliage injury when applied as an aqueous spray having a concentration of 3 pounds of active ingredient per 100 gallons of ultimate solution. Saturated solutions of N-(hydroxypropyl) taurine and N-methyl,N-(hydroxyethyl) taurine gave complete inhibition of the growth of *Salmonella typhosus* in agar culturing media saturated with said compounds. The N-(hydroxyalkyl) taurines of this invention are also useful as intermediates for the preparation of ester-type surfactants by reaction with oleic and similar long chain fatty acids.

The following examples show ways in which the invention has been practiced.

*Example 1*

A solution of 2 moles of the sodium salt of taurine dissolved in 500 grams of water was placed in a 3-liter, 4-necked flask equipped with a Dry Ice reflux head vented to a Dry Ice trap, a stirrer, a thermometer and a sparger for introducing ethylene oxide under the surface of the liquid. The stirrer was started and the flask was cooled in an ice bath. Four moles of ethylene oxide was then added over a period of 45 minutes, the reaction temperature varying between 12 and 18° C. The reaction mixture was passed through a bed of sulfonated, cross-linked, polystyrene cation exchange resin in the acid form to remove the sodium ion, and the eluate therefrom was concentrated and recrystallized from acetic acid to give 325 g. (71 percent yield) of N,N-bis(2-hydroxyethyl)taurine having a melting point of 152–3° C. and a nitrogen content (Kjeldahl) of 6.50 percent as compared with a theoretic nitrogen content of 6.57 percent.

*Example 2*

The procedure of Example 1 was repeated using as reactants: equimolar portions of ethylene oxide and the sodium salt of N-methyltaurine to make N-methyl, N-(2-hydroxyethyl)taurine; equimolar portions of propylene oxide and sodium salt of taurine to make N-(hydroxypropyl)taurine; and 2 moles of propylene oxide and the sodium salt of taurine to make N,N-bis(hydroxypropyl)-taurine.

When a propylene oxide is used as a co-reactant, there can be obtained a 1-methyl-2-hydroxyethyl or a 2-methyl-2-hydroxyethyl substituent radical, hereinafter characterized as "hydroxypropyl"; and, similarly, when a 1,2- or 2,3-butylene oxide is used as a co-reactant there can be obtained a 1- or 2-ethyl-2-hydroxyethyl or 1,2-dimethyl-2-hydroxyethyl substituent radical. When isobutylene oxide is a co-reactant, there can be obtained a 1,1- or 2,2-dimethyl-2-hydroxyethyl substituent radical. The substituent radicals obtainable from the indicated butylene oxides will be characterized hereinafter as "hydroxybutyl."

*Example 3*

A quantity of 278 g. (2 moles) of N-methyltaurine, one liter of water and 80 g. (2 moles) of sodium hydroxide were added to a three-liter 4-necked flask equipped with a glass agitator, reflux condenser and dropping funnel. The reaction medium was stirred and maintained at 0° to 20° C. until a homogeneous solution resulted. Butylene oxide, 144 g. (2 moles: 92 percent 1,2- and 8 percent 2,3-butylene oxide), was then added dropwise over a period of 1¼ hours while the reaction temperature was maintained at 20° to 40° C. The reaction mixture was then slowly heated to 100° C. to determine, by its refluxing, whether unreacted butylene oxide was present in the reaction medium. No butylene oxide refluxed during such heating step. The reaction mixture was then evaporated under vacuum on a steam bath to give a sirupy N-(hydroxybutyl), N-methyltaurine which was soluble in methanol and in 95 percent ethanol. The sirupy product was diluted with one liter of water and passed through a tower containing sulfonated cross-linked polystyrene cation exchange resin in the acid form to remove sodium ion. The eluate was evaporated on the steam bath under vacuum to give a glassy solid weighting 442 g. The glassy solid was titrated to the neutral point using a pH meter. The titrimetic assay showed 95.5 percent free acid in the glassy solid, amounting to 422 grams, a 100 percent yield. A sample of the free acid crystallized from ethanol had a melting point of 179°–180° C. and a nitrogen content (Kjeldahl) of 6.60 percent as compared with a theoretic content of 6.63 percent of nitrogen.

What is claimed is:

1. A method for preparing taurine derivatives having the formula

wherein R is a member of the group consisting of H and alkali metals, R' is a member of the group consisting of hydrogen, the methyl radical and hydroxyalkyl radicals containing from 2 to 4 carbon atoms, and R'' is a hydroxyalkyl radical containing 2 to 4 carbon atoms, which method comprises reacting a member of the group consisting of alkali metal salts of taurine and of N-methyltaurine with a substantially stoichiometric proportion of an alkylene oxide of the group consisting of 1,2- and 2,3-alkylene oxides containing from 2 to 4 carbon atoms at a temperature between 5° and 40° C. in an aqueous medium and recovering a taurine derivative product.

2. A method for preparing an N-(hydroxyalkyl)taurine which method comprises reacting the sodium salt of taurine with a substantially stoichiometric proportion of an alkylene oxide selected from the group consisting of 1,2- and 2,3-alkylene oxides containing from 2 to 4 carbon atoms at a temperature between 5° and 40° C. in an aqueous medium to replace at least one of the amino hydrogens of the sodium salt of taurine and recovering an N-(hydroxyalkyl)taurine product.

3. The method of claim 2 wherein an aqueous solution of the sodium salt of an N-(hydroxyalkyl)taurine is passed through a cation exchange resin column in the acid form to remove sodium ion and the N-(hydroxyalkyl)taurine product is recovered as the free acid.

4. A method for preparing an N-(hydroxyalkyl),N-methyltaurine which method comprises reacting the sodium salt of N-methyltaurine with a substantially equimolar equivalent of an alkylene oxide selected from the group consisting of 1,2- and 2,3-alkylene oxides containing from 2 to 4 carbon atoms at a temperature between 5° and 40° C. in an aqueous medium and recovering an N-(hydroxyalkyl),N-methyltaurine product.

5. The method of claim 4 wherein the aqueous solution containing the sodium salt of an N-(hydroxyalkyl),N-methyltaurine is passed through a cation exchange resin column in the acid form to remove sodium ion and the N-(hydroxyalkyl), N-methyltaurine product is recovered as the free acid.

6. The compounds

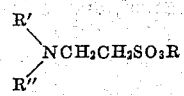

wherein R is a member of the group consisting of hydrogen and alkali metals, R' is a member of the group consisting of hydrogen, the methyl radical and hydroxyalkyl radicals containing from 2 to 4 carbon atoms and R'' is a hydroxyalkyl radical containing from 2 to 4 carbon atoms.

7. N-(2-hydroxyethyl)taurine.
8. N,N-bis(2-hydroxyethyl)taurine.
9. N-methyl,N-(2-hydroxyethyl)taurine.
10. N-(hydroxypropyl)taurine.
11. N-methyl,N-(hydroxypropyl)taurine.

No references cited.